United States Patent [19]

Heitmann

[11] 4,423,851
[45] Jan. 3, 1984

[54] RUBBER CLOTH FOR COPYING MACHINES

[76] Inventor: Svend A. Heitmann, Sortemosevej 191, 2730 Herley, Denmark

[21] Appl. No.: 292,289

[22] Filed: Aug. 12, 1981

[51] Int. Cl.³ .............................................. G03B 27/64
[52] U.S. Cl. ...................................... 248/362; 355/73; 355/76; 355/91; 428/81; 428/69; 428/157; 428/188; 428/192; 269/20
[58] Field of Search ....................... 355/76, 73, 75, 91; 248/362, 363; 428/81, 157, 188, 192, 69; 269/21, 22, 20; 100/211; 156/87, 104, 286

[56] References Cited

FOREIGN PATENT DOCUMENTS 3030400 3/1981 Fed. Rep. of Germany ........ 355/73

Primary Examiner—Alexander S. Thomas
Attorney, Agent, or Firm—Burgess, Ryan and Wayne

[57] ABSTRACT

In copying machines, cameras etc. the blanks (6, 7) are placed between a glass plate and a support consisting of a rubber cloth (1), which is supplied with a circumferential bead (2). By exhaustion of the field of activity (5) of the rubber cloth (1) the blanks (6, 7) are pressed firmly against the glass plate, and in order to obtain an even exhaustion of the whole field (5) the rubber cloth (1) is supplied with a strip (3) of rubber or plastics along the bead (2) with transversing ducts (4), which are in connection with exhaustion openings (9).

3 Claims, 4 Drawing Figures

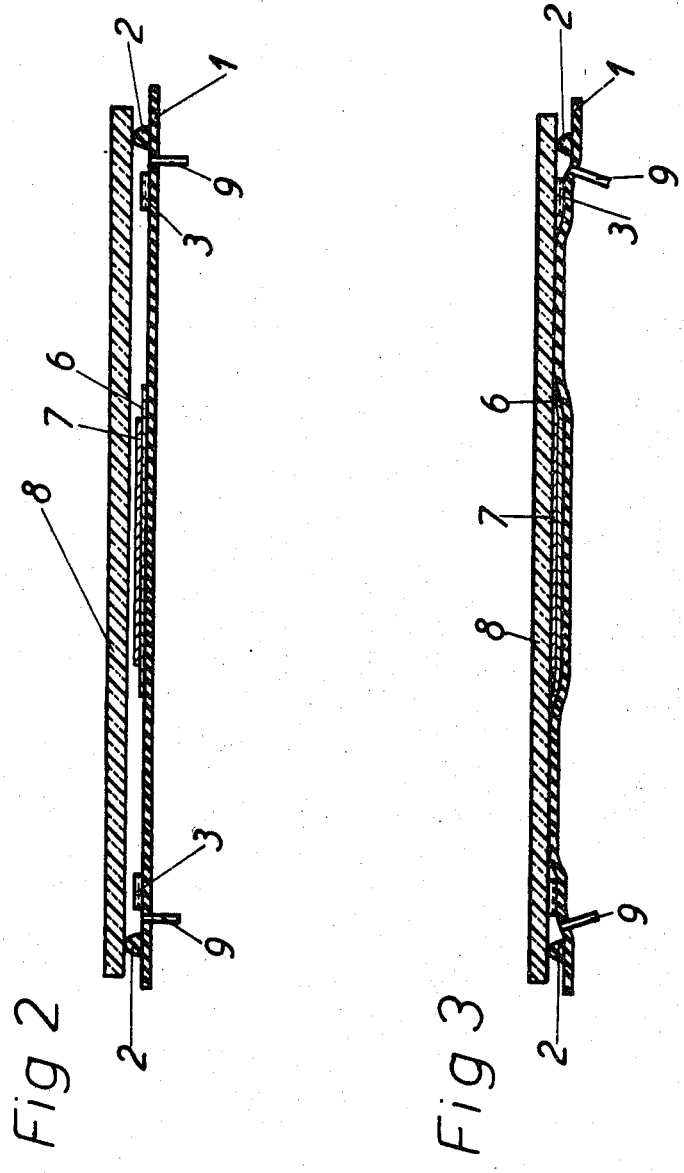

RUBBER CLOTH FOR COPYING MACHINES

The invention relates to a rubber cloth for copying machines, cameras, and the like which is supplied with a bead along the edges for airtight fitting for a glass plate, and further supplied with one or several openings for the exhaustion of the space between the glass plate and the rubber cloth.

Rubber cloths in use today of the kind mentioned above are supplied with a single suction socket near the bead. These cloths are in practice subject to certain disadvantages because of uneven evacuation of the space between the field of activity of the cloth and the cover plate of glass abutting the bead. The uneven vacuum often causes the creation of air pockets or "lakes" between the glass plate and the blank, which may lead to uneven exposure of the blank.

The aim of the invention is to provide a rubber cloth that ensures an even, vacuum over the whole field of activity.

BRIEF DESCRIPTION OF THE INVENTION

The object of the invention is achieved by supplying the rubber cloth with a device along and at the inside of the bead with several aspirating ducts and connecting the field of activity of the rubber cloth and the exhaustion openings. By exhaustion the device is pressed against the glass plate, providing for even evacuation along the total circumference of the rubber cloth.

The instant product may consist of a strip of rubber or plastic, which is placed at the inside of the evacuation openings and supplied with ducts. This rubber or plastic strip is especially adapted being fastened to already existing cloths which then only need to be supplied with some extra suction sockets.

Finally, the device can consist of the bead, which is supplied with a tongue that may decrease towards the middle of the cloth, and which is supplied with aspirating ducts ending at the inner edge of the tongue and in connection with an aspirating duct in the bead. This embodiment is advantageous by producing new cloths, as the bead with tongue and aspirating ducts can be moulded in one piece.

BRIEF DESCRIPTION OF THE DRAWINGS

The invention will now be further explained with reference to the drawing, where FIG. 2 is a sectional view taken at II—II on FIG. 1, FIG. 3 is the same after exhaustion of the field of activity of the rubber cloth.

DETAILED DESCRIPTION OF THE INVENTION

Figure 1:
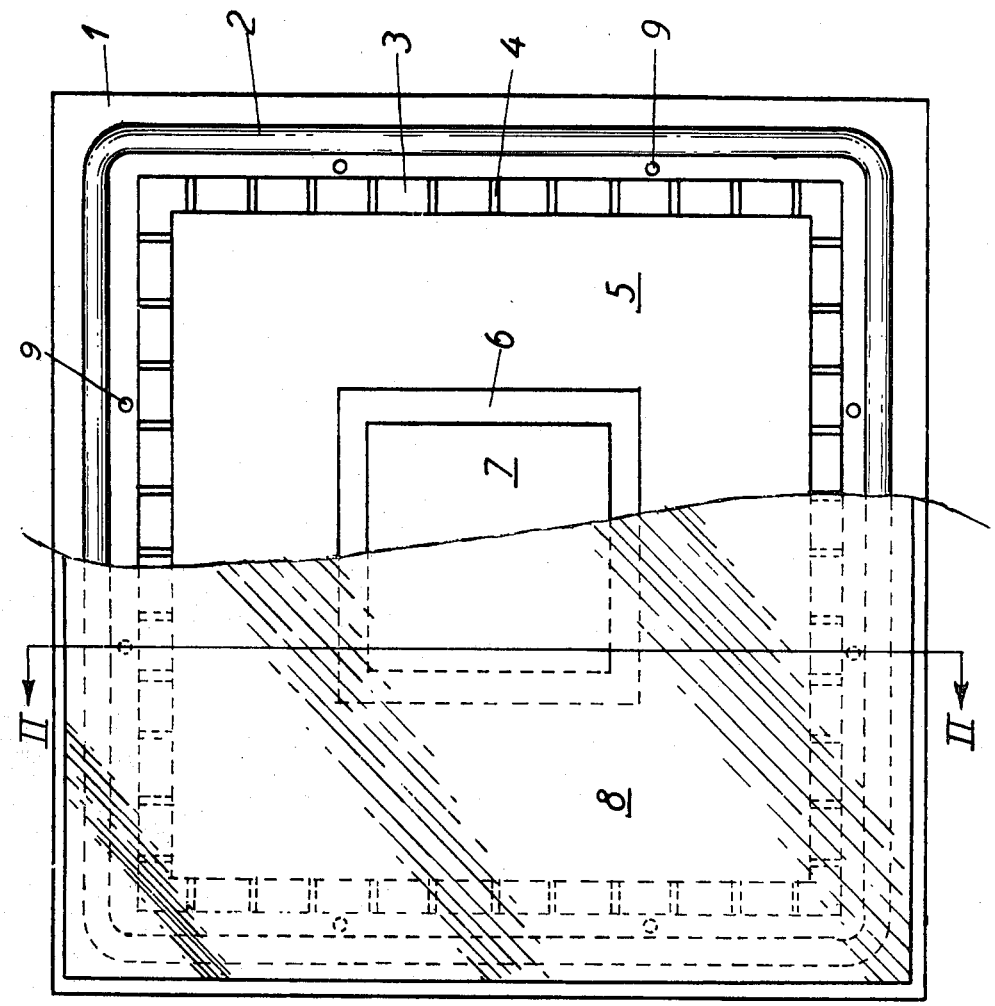
FIG. 1 shows a rubber cloth according to the invention, seen from above and partly covered by a glass plate.

FIG. 1 shows a rubber cloth 1 seen from above and supplied with a bead 2 of rubber or another similar impervious and deformable material along the edges of the rubber cloth 1. Inside this bead 2 a strip 3 of rubber or plastics is placed parallel to the bead 2. This strip 3 is supplied with transverse ducts 4 in the shape of channels or milled grooves. On the field of activity 5 of the rubber cloth 1, a photographic material 6 and a photographic negative plate 7 or the like that is to be copied are arranged. A glass plate 8 is placed on the bead 2. In the space between the bead 2 and the strip 3 there are evacuation openings 9 in the shape of sockets, as shown in FIG. 2.

By evacuating the field of activity 5 of the rubber cloth 1, the rubber cloth 1 and with it the blanks 6 and 7 are pressed against the glass plate 8 so that a complete contact between the blanks 6 and 7 and the glass plate 8 is obtained. The field of activity 5 of the rubber cloth 1 can be supported by means of an embedded plate of e.g., soft PVC.

Figure 4:
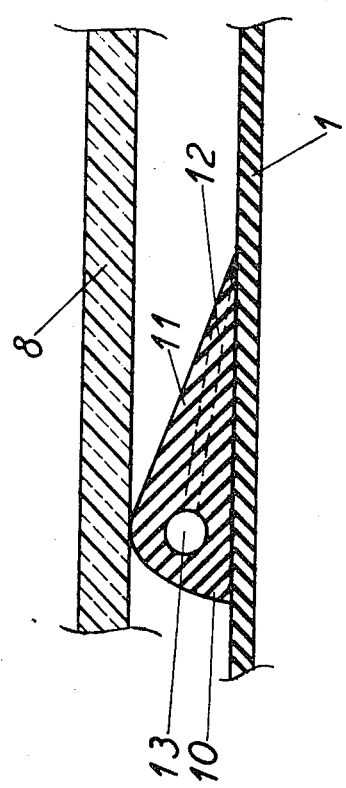
FIG. 4 shows a part of another embodiment of a rubber cloth according to the invention.

FIG. 4 shows another embodiment of a bead 10 with a tongue 11. This tongue 11 is supplied with transverse ducts 12, ending at the edge of the tongue 11 and in connection with a longitudinal aspirating duct 13 in the bead 10.

I claim:

1. In a rubber cloth having an active field for supporting a substrate against a glass plate comprising a rubber cloth having a bead of deformable impervious material near its edge to form an airtight fitting with the glass plate; means for evacuating the space within said bead between the rubber cloth and the glass plate said means positioned outside of the active field, and a bearing surface having a plurality of aspirating ducts said bearing surface positioned between and in communication with the active field and the means for evacuation of the space between the rubber cloth and the glass plate.

2. The rubber cloth of claim 1 wherein the bearing surface comprises a strip of material having a plurality of ducts which communicate with the active field and the evacuation means.

3. The rubber cloth of claim 1 wherein the bead in cross section comprises a high portion which bears against the glass plate and a wedge shaped bearing surface having the thin portion of the wedge shaped bearing surface adjacent the active field, said wedge shaped portion having aspirating ducts which communicate with the active field on one end and an evacuation conduit in the bead at the opposite end.

* * * * *